F. G. Johnson,
Safety Hook,

Nº 38,490.  Patented May 12, 1863.

Witnesses:
Frederick S. Cabot
William J. Wheeler

Inventor:
Frank G. Johnson

UNITED STATES PATENT OFFICE.

FRANK G. JOHNSON, OF BROOKLYN, NEW YORK.

IMPROVED HOOK FOR OX-CHAINS.

Specification forming part of Letters Patent No. 38,490, dated May 12, 1863; antedated November 7, 1861.

*To all whom it may concern:*

Be it known that I, FRANK G. JOHNSON, of the city of Brooklyn, in the county of Kings and State of New York, have invented a new and useful Safety-Hook for Ox-Chains and other Uses; and I do hereby declare that the following is a full, clear, and exact description of the construction and operation of the same, reference being had to the accompanying drawings, making a part of this specification, in which—

Figure 1:
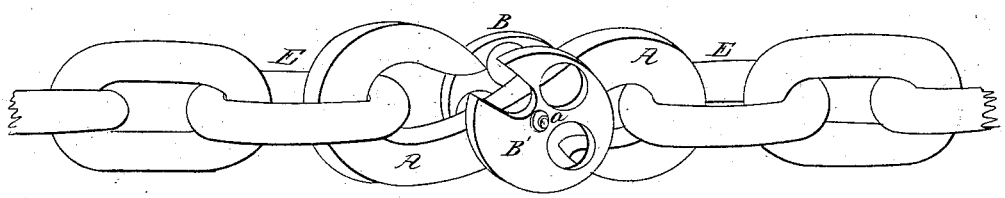
Figure 5:
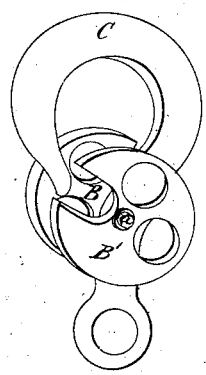
Figure 2:
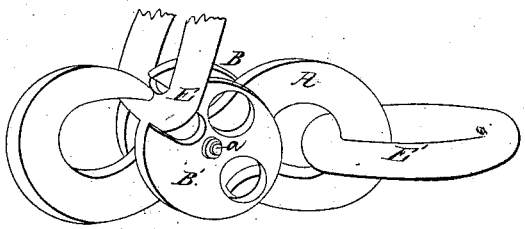
Figure 3:
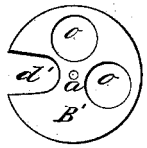
Figure 6:
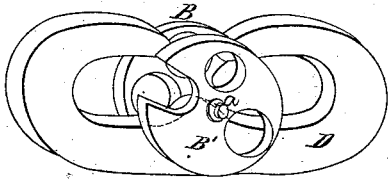
Figure 4:
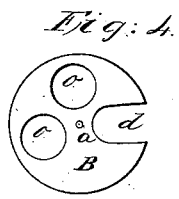

Figure 1 is a perspective view; Fig. 2, a perspective view with one end of the hook in the unhooking position; Figs. 3 and 4, disks or circular tumblers; Fig. 5, a perspective view of a simple or single hook; Fig. 6, a perspective view of a double hook with both ends turned the same way, instead of being formed like the letter S, as in Fig. 1.

Like letters refer to like parts.

The object of my invention is to provide a cheap, easily operated, and durable chain-hook for agricultural and other purposes, which shall be perfectly safe against unhooking by ordinary use or accident.

The operation of my invention is quite apparent and thus described: I take any ordinary hook, as A A in Figs. 1 and 2, C in Fig. 5, and D in Fig. 6, and fasten on each side of the same a circular tumbler, B and B.' These tumblers are fastened to the hook by a simple rivet passing through the hook and tumblers. (Shown by $a$.) This rivet is loose in the hook and tumblers, so as to leave the tumblers perfectly free to revolve on the rivet. These tumblers are so placed on the hook that they will reach from the body of the hook to the point of the same, so that if the disks of the tumblers were complete nothing could be passed between the body and point of the hook. Now, by cutting out the slots or curves $d\ d'$ in the tumblers, Figs. 3 and 4, and then turning these slots opposite to each other the link of a chain and other objects can be freely passed between the point and body into the bend of the hook, as seen by the link E in Fig. 2. The hook is unhooked in the same manner it is hooked. To prevent these two slots, $d$ and $d'$, from accidentally coming opposite to each other and thus affording a chance for the chain to pass out of the hook, I make the two holes $o\ o$, Figs. 3 and 4, in the tumblers in such a position with relation to the slots $d\ d$ as shall make one half or side of each tumbler lighter than the other half, so that by gravity the same side of the tumbler is always down when the hook stands edgewise. Now, if the two tumblers, Figs. 3 and 4, were placed on the hook as they stand in the drawings, the two slots $d\ d'$ would stand not in range of each other, but nearly as far apart as it is possible to place them by hand. Whenever the link is passed out of or into the hook these tumblers at once assume this position, so that if the slot of one tumbler stands at any time so that it leaves the point of the hook unguarded the unbroken periphery of the other tumbler is sure to protect the point. These two tumblers are made precisely alike, only in placing them on the hook one face is reversed from the other. I do not, of course, confine the application of this device to any particular style of hooks; neither do I limit the number of tumblers to two, as in certain cases more can be used, thus rendering greater safety against unhooking.

What I, therefore, claim, and desire to secure by Letters Patent of the United States, is—

The combination together of the hook A and the slotted and weighted tumblers B B', two or more, substantially in the manner and for the purposes herein set forth.

FRANK G. JOHNSON.

Witnesses:
W. T. B. MILLIKEN,
WILLIAM T. WHEELER.